United States Patent [19]
Jerabek et al.

[11] 3,935,087
[45] Jan. 27, 1976

[54] METHOD FOR ELECTRODEPOSITION OF SELF-CROSSLINKING CATIONIC COMPOSITIONS

[75] Inventors: Robert D. Jerabek, Glenshaw; Joseph R. Marchetti, Greensburg, both of Pa.

[73] Assignee: PPG Industries, Inc., Pittsburgh, Pa.

[22] Filed: Dec. 23, 1974

[21] Appl. No.: 535,592

Related U.S. Application Data

[63] Continuation-in-part of Ser. No. 317,864, Dec. 22, 1972, abandoned.

[52] U.S. Cl. ............................................... 204/181
[51] Int. Cl.$^2$........................................ C25D 13/06
[58] Field of Search ..................................... 204/181

[56] References Cited
UNITED STATES PATENTS

| | | | |
|---|---|---|---|
| 3,773,729 | 11/1973 | Wakimoto et al. | 204/181 |
| 3,804,786 | 4/1974 | Sekmakas | 204/181 |
| 3,869,366 | 3/1975 | Suzuki et al. | 204/181 |

*Primary Examiner*—Howard S. Williams
*Attorney, Agent, or Firm*—William J. Uhl

[57] ABSTRACT

It has been found that aqueous coating compositions comprising a resin containing capped or blocked isocyanate groups, quaternary onium salt groups and, optionally, free epoxy groups may be electrodeposited on a cathode to produce coatings having highly desirable properties.

16 Claims, No Drawings

METHOD FOR ELECTRODEPOSITION OF SELF-CROSSLINKING CATIONIC COMPOSITIONS

CROSS-REFERENCE TO RELATED APPLICATION

This application is a continuation-in-part of co-pending Application Ser. No. 317,864, filed Dec. 22, 1972, now abandoned.

BACKGROUND OF THE INVENTION

Electrodeposition as a coating application method involves the deposition of a film-forming material under the influence of an applied electrical potential, and has become of increasing commercial importance. Along with the increased use of such methods has been the development of various compositions which provide more or less satisfactory coatings when applied in this manner. However, most conventional coating techniques do not produce commercially usable coatings, and electrodeposition of many coating materials, even when otherwise successful, is often attended by various disadvantages such as non-uniform coatings and by poor throw power, i.e., the ability to coat areas of the electrode which are remote or shielded from the other electrode. In addition, the coatings obtained are in many instances deficient in certain properties essential for their utilization in certain applications for which electrodeposition is otherwise suited. In particular, properties such as corrosion resistance are difficult to achieve with the resins conventionally employed in electrodeposition processes, and many electrodeposited coatings are subject to discoloration or staining because of chemical changes associated with electrolytic phenomena at the electrodes and with the types of resinous materials ordinarily utilized. This is especially true with the conventional resin vehicles used in electrodeposition processes which contain polycarboxylic acid resins neutralized with a base; these deposit on the anode and because of their acidic nature tend to be sensitive to common types of corrosive attack, e.g., by salt, alkali, etc. Further, anodic deposition tends to place the uncured coating in proximity to metal ions evolved at the anode, thereby causing staining with many coating systems.

DESCRIPTION OF THE INVENTION

It has now been found that aqueous coating compositions comprising a resin containing capped or blocked isocyanate groups, quaternary onium salt groups and, optionally, free epoxy groups may be electrocoated on a cathode to produce coatings with highly desirable properties, including alkali resistance and corrosion resistance and color stability.

The cationic resins described above can be prepared by reacting a portion of the hydroxyl groups of a hydroxyl-containing epoxy group-containing organic material with a partially-capped or blocked organic polyisocyanate, followed by reacting at least a portion of the epoxy groups in a manner so as to add pendant quaternary onium (preferably sulfonium) salt groups to render the resin water dispersible or solubilized.

The partially- or semi-capped or blocked isocyanate which may be employed in preparing the compositions of the invention may be any polyisocyanate where a portion of the isocyanato groups have been reacted with a compound so that the resultant capped isocyanate portion is stable to hydroxyl groups at room temperature but reactive with hydroxyl groups at elevated temperatures, usually between about 200° and about 600°F. The semi-capped polyisocyanate employed should contain an average of about one free reactive isocyanate group.

In the preparation of the partially-blocked organic polyisocyanate, any suitable organic polyisocyanate may be used. Representative examples are the aliphatic compounds such as trimethylene, tetramethylene, pentamethylene, hexamethylene, 1,2-propylene, 1,2-butylene, 2,3-butylene, 1,3-butylene, ethylidine and butylidene diisocyanates; the cycloalkylene compounds such as 1,3-cyclopentane, 1,4-cyclohexane and 1,2-cyclohexane diisocyanates; the aromatic compounds, such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear-substituted aromatic compounds, such as dianisidine diisocyanate, 4,4'-diphenylether diisocyanate and chlorodiphenylene diisocyanate; the triisocyanates such as triphenyl methane-4,4',4''-triisocyanate, 1,3,5-triisocyanate benzene and 2,4,6-triisocyanate toluene; and the tetra-isocyanates such as 4,4'-diphenyl-dimethyl methane-2,2',5,5'-tetraisocyanate; the polymerized polyisocyanates such as tolylene diisocyanate dimers and trimers, and the like.

Preferably, the polyisocyanate employed should have isocyanate groups with varied reactivity to facilitate the partially-blocking reaction.

In addition, the organic polyisocyanate may be a prepolymer derived from a polyol, including polyether polyol or polyester polyol, including polyethers which are reacted with excess polyisocyanates to form isocyanate-terminated prepolymers. The polyols may be simple polyols such as glycols, e.g., ethylene glycol and propylene glycol, as well as other polyols such as glycerol, trimethylolpropane, hexanetriol, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose, and the like, with alkylene oxides such as ethylene oxide, propylene oxide, their mixtures, and the like.

Any suitable aliphatic, cycloaliphatic aromatic alkyl monoalcohol and phenolic compounds may be used as a blocking agent in accordance with the present invention, such as, for example, lower aliphatic alcohols, such as methyl, ethyl, chloroethyl, propyl, butyl, amyl, hexyl, heptyl, octyl, nonyl, 3,3,5-trimethylhexanol, decyl, and lauryl alcohols, and the like; the cycloaliphatic alcohols such as, for example, cyclopentanol, cyclohexanol, and the like; the aromatic alkyl alcohols, such as, phenylcarbinol, methylphenylcarbinol, ethylene glycol monoethyl ether, ethylene glycol monobutyl ether, and the like; the phenolic compounds such as phenol itself, substituted phenols in which the substituents do not adversely affect the coating operations. Examples include cresol, xylenol, nitrophenol chlorophenol, ethyl phenol, t-butyl phenol, and 2,5-di-t-butyl-4-hydroxy toluene. Minor amounts of higher molecular weight, relatively non-volatile monoalcohols may be used, if desired, to serve as plasticizers in the coatings provided by this invention.

Additional blocking agents include tertiary hydroxylamines such as diethylethanolamine and oximes such as methyl ethyl ketone oxime, acetone oxime and cyclohexanone oxime. Use of oximes is particularly desirable because polyisocyanates blocked with oximes uncap at relatively low temperatures without the need for externally added urethane forming catalyst such as the tin catalyst described below.

The semi-capped organic polyisocyanate is formed by reacting a sufficient quantity of blocking agent with the organic polyisocyanate to provide a product having one free isocyanate group remaining. The reaction between the organic polyisocyanate and the blocking agent is generally exothermic. The polyisocyanate and the blocking agent are preferably admixed at low temperatures to promote isocyanate group selectivity.

The epoxy group-containing organic material reacted with the partially-capped polyisocyanate can be any monomeric or polymeric compound or mixture of compounds having a 1,2-epoxy equivalency greater than 1.0, that is, in which the average number of 1,2-epoxy groups per molecule is greater than one and containing hydroxyl functionality. It is preferred that the epoxy compound be resinous, that is, a polyepoxide, i.e., containing more than one epoxy group per molecule and containing free hydroxyl groups. The polyepoxide can be any of the well-known hydroxyl-containing epoxides. Examples of these polyepoxides have, for example, been described in U.S. Patents Nos. 2,467,171; 2,615,007; 2,716,123; 3,030,336; 3,053,855 and 3,075,999.

A useful class of polyepoxides are the polyglycidyl ethers of polyphenols, such as Bisphenol A. These may be produced, for example, by etherification of a polyphenol with epichlorohydrin or dichlorohydrin in the presence of an alkali. The phenolic compound may be bis(4-hydroxyphenyl)2,2-propane, 4,4'-dihydroxybenzophenone, bis(4-hydroxyphenyl)1,1-isobutane; bis(4-hydroxytertiarybutylphenyl)-2,2-propane, bis(2-hydroxynaphthyl)methane, 1,5-hydroxynaphthalene, or the like. Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycreol, bis(4-hydroxycyclohexol)2,2-propane, and the like.

Another class of polyepoxides are those containing oxyalkylene groups in the epoxy molecule. Such oxyalkylene groups are typically groups of the general formula:

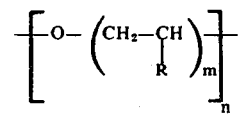

where R is hydrogen or alkyl, preferably lower alkyl (e.g., having 1 to 6 carbon atoms) and where, in most instances, $m$ is 1 to 4 and $n$ is 2 to 50. Such groups can be pendant to the main molecular chain of the polyepoxide or part of the main chain itself. The proportion of oxyalkylene groups in the polyepoxide depends upon many factors, including the chain length of the oxyalkylene group, the nature of the epoxy and the degree of water solubility desired. Usually the epoxy contains at least about one percent by weight or more, and preferably 5 percent or more of oxyalkylene groups.

Some polyepoxides containing oxyalkylene groups are produced by reacting some of the epoxy groups of a polyepoxide, such as the epoxy resins mentioned above, with a monohydric alcohol containing oxyalkylene groups. Such monohydric alcohols are conveniently produced by oxyalkylating an alcohol, such as methanol, ethanol, or other alkanol, with an alkylene oxide. Ethylene oxide, 1,2-propylene oxide and 1,2-butylene oxide are especially useful alkylene oxides. Other monohydric alcohols can be, for example, the commercially-available materials known as Cellosolves and Carbitols, which are monoalkyl ethers of polyalkylene glycols. The reaction of the monohydric alcohol and the polyepoxide is generally carried out in the presence of a catalyst. Formic acid, dimethylethanolamine, diethylethanolamine, N,N-dimethylbenzylamine and, in some cases, stannous chloride are useful for this purpose.

Similar polyepoxides containing oxyalkylene groups can be produced by oxyalkylating the epoxy resin by other means, such as by direct reaction with an alkylene oxide.

The polyepoxide employed to produce the foregoing epoxies containing oxyalkylene groups contain a sufficient number of epoxy groups so that the average number of residual epoxy groups per molecule remaining in the product after the oxyalkylation is greater than 1.0. These epoxides, which tend to contain unreacted alcohols or hydroxyl-containing byproducts, are presently less preferred unless purified to remove interfering hydroxyl containing materials.

The presently preferred class of resins which may be employed is acrylic polymers containing epoxy groups and hydroxyl groups. Preferably these acrylic polymers are polymers formed by copolymerizing an unsaturated epoxy-containing monomer, such as, for example, glycidyl acrylate or methacrylate, a hydroxyl-containing unsaturated monomer and at least one other unsaturated monomer.

Any polymerizable monomeric compound containing at least one

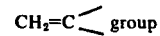

preferably in terminal position, may be polymerized with the unsaturated glycidyl compounds. Examples of such monomers include aromatic compounds such as phenyl compounds, for example, styrene, alpoha-methylstyrene, vinyl toluene and the like. Also aliphatic compounds such as olefinic acids and esters such as acrylic acid, methylacrylate ethyl acrylate, methyl methacrylate and the like.

In carrying out the polymerization reaction, techniques well known in the art may be employed. A peroxygen type catalyst is ordinarily utilized; diazo compounds or redox catalyst systems can also be employed as catalysts.

The preferred hydroxy-containing unsaturated monomers are hydroxyalkyl acrylates, for example, hydroxyethyl acrylate or methacrylate or hydroxypropyl acrylate or methacrylate may be used.

Another method of producing acrylic polymers which may be utilized in this invention is to react an acrylic polymer containing reactive sites, including hydroxyl groups, with an epoxy-containing compound such as the diglycidyl ether of Bisphenol A or other polyepoxides as enumerated elsewhere herein, to provide an epoxy group-containing hydroxyl group-containing acrylic polymer.

The proportions of the epoxy group hydroxy group-containing resin reacted with the semi-capped polyisocyanate is not unduly critical. Preferably sufficient semi-capped isocyanate is employed to provide an adequate number of crosslinking sites to provide a cured film. Usually about one-half of the available hydroxyl groups are reacted. The maximum amount usually reacted can be the equivalence of the total hydroxyl functionality.

Preferably this reaction of epoxy resin and partially-capped organic polyisocyanate is conducted at low or moderate temperatures, generally less than about 120°C. to preserve the capped isocyanate groups in order to avoid gelation and to retain latent crosslinking sites. Usually the reaction is conducted in the presence of a catalyst for urethane formation at a temperature between about 60°C. and about 120°C. Temperatures of about 100°C. are commonly employed.

The resultant capped urethane group-containing epoxy group-containing adduct is then subsequently reacted to form quaternary group-containing resins.

To form the quaternary ammonium group-containing resins of the invention, the epoxy group-containing compound is reacted with a tertiary amine salt to form quaternary amine salt group-containing resins.

Where final resins containing free epoxide groups are desired, the ratio of starting polyepoxide to amine salt is selected so as to provide an excess of epoxy groups, thereby producing a resin containing free unreacted epoxide groups. Epoxy free resins can be prepared by reacting stoichiometric amounts of amine salts with the available epoxide groups. Epoxy-free resins can also be provided by hydrolysis or post reaction of the epoxide-amine salt reaction product.

Examples of tertiary amine salts which may be employed include salts of boric acid or an acid having a dissociation constant greater than that of boric acid or an acid having a dissociation constant greater than that of boric acid and preferably an organic acid having a dissociation constant greater than about $1 \times 10^{-5}$. The presently-preferred acid is lactic acid. Such acids include boric acid, lactic acid, acetic acid, formic acid, propionic acid, butyric acid, hydrochloric acid, phosphoric acid and sulfuric acid. The amines may be unsubstituted amines or amines substituted with non-reactive constituents such as halogens or hydroxyl-amines. Specific amine salts include salts of dimethylethanolamine, triethylamine, trimethylamine, triisopropanol, amine and the like. Examples include dimethylethanolamine borate, dimethylethanolamine lactate, dimethylethanolamine acetate, dimethylethanolamine chloride, dimethylethanolamine phosphate, as well as other amine salts as defined above. Examples of other suitable amines are disclosed in U.S. Pat. No. 3,839,252 to Bosso and Wismer in Column 5, line 3 through Column 7, line 42 which is hereby incorporated by reference.

The amino salts and the epoxy compound are reacted by mixing the components, preferably in the presence of a controlled amount of water. The amount of water employed should be that amount of water which allows for smooth reaction with retention of epoxy groups but not sufficient to cause extremely slow or non-reaction. Typically, the water is employed on the basis of about 1.75 percent to about 20 percent by weight, based on the total reaction mixture solids and preferably about 2 percent to about 15 percent by weight, based on total reaction solids.

Another measure of the amount of water which may be employed is the equivalent ratio of water to amine nitrogen present in the reaction mixture. Typically, the equivalent ratio of water to amine nitrogen is controlled between about 1.3 and about 16 equivalents of water per equivalent of amine nitrogen. Preferably, the ratio of water to amine nitrogen is controlled between about 1.5 and about 10.6 equivalents of water per equivalent of amine nitrogen.

The reaction temperature may be varied between about the lowest temperature at which the reaction reasonably proceeds, for example, room temperature, or in the usual case, slightly above ordinary room temperature to a maximum temperature between about 100°C. and about 110°C.

A solvent is not necessary, although one is often used in order to afford better control of the reaction. Aromatic hydrocarbons or monoalkyl ethers of ethylene glycol are suitable solvents. The proportions of the amine salt and the epoxy compound can be varied and the optimum proportions depend upon the particular reactants. Ordinarily, however, from about one part to about 50 parts by weight of the salt per 100 parts of epoxy compound are employed. The proportions are usually chosen with reference to the amount of nitrogen, which is typically from about 0.05 to about 16 percent based on the total weight of the amine salt and the epoxy compound. Since the amine salt reacts with the epoxide groups of the epoxy resin employed, in order to provide an epoxy group-containing resin, the stoichiometric amount of amine employed should be less than the stoichiometric equivalent of the epoxide groups present, so that the final resin is provided with one epoxy group per average molecule.

Phosphonium group-containing resins can be prepared by reacting the above epoxy compounds with a phosphine in the presence of an acid to form quaternary phosphonium base group-containing resins.

The phosphine employed may be virtually any phosphine which does not contain interferring groups. For example, the phosphine may be aliphatic, aromatic or alicyclic. Examples of such phosphines include lower trialkyl phosphine, such as trimethyl phosphine, triethyl phosphine, tripropyl phosphine, tributyl phosphine, mixed lower alkyl phenyl phosphines, such as phenyl dimethyl phosphine, phenyl diethyl phosphine, phenyl dipropyl phosphine, diphenyl methyl phosphine, diphenyl ethyl phosphine, diphenyl propyl phosphine, triphenyl phosphine, alicyclic phosphines such as tetramethylene methyl phosphine and the like.

The acid employed may be virtually any acid which forms a quaternary phosphonium salt. Preferably the acid is an organic carboxylic acid. Examples of the acids which may be employed are boric acid, lactic acid, formic acid, acetic acid, propionic acid, butyric acid, hydrochloric acid, phosphoric acid, and sulfuric acid. Preferably the acid is an acid having a dissociation constant greater than about $1 \times 10^{-5}$.

The ratio of phosphine to acid is not unduly critical. Since one mole of acid is utilized to form one mole of phosphonium group, it is preferred that at least about one mole of acid be present for each mole of desired phosphine-to-phosphonium conversion.

The phosphine/acid mixture and the epoxy compound are reacted by mixing the components, sometimes at moderately elevated temperatures. The reaction temperature is not unduly critical and is chosen depending upon the reactants and their rates. Frequently the reaction proceeds well at room temperature or temperatures up to 70°C., if desired. In some cases, temperatures as high as about 110°C. or higher may be employed. A solvent is not necessary, although one is often used in order to afford better control of the reaction. Aromatic hydrocarbons, monoalkyl ethers of ethylene glycol, and aliphatic alcohols are suitable solvents. The proportions of the phosphine and the epoxy compound can be varied and the optimum proportions depend upon the particular reactants. Ordinarily, however, from about one part to about 50 parts by weight of the phosphine per 100 parts of epoxy compound is employed. The proportions are usually chosen with reference to the amount of phosphine, which is typically from about 0.1 to about 35 percent, based on the total weight of the phosphine and the epoxy compound.

Sulfonium group-containing resins can be prepared by reacting the above epoxy compounds with a sulfide in the presence of an acid to form quaternary sulfonium base group-containing resins.

The sulfide employed may be virtually any sulfide which reacts with epoxy groups and which does not contain interfering groups. For example, the sulfide may be aliphatic, mixed aliphatic-aromatic, aralkyl or cyclic. Examples of such sulfides include dialkyl sulfides such as diethyl sulfide, dipropyl sulfide, dibutyl sulfide, dihexyl sulfide, phenyl sulfide or alkyl phenyl sulfides such as diphenyl sulfide, ethyl phenyl sulfide, alicyclic sulfides, such as tetramethylene sulfide, pentamethylene sulfide, hydroxyl alkyl sulfides such as thiodiethanol, thiodipropanol, thiodibutanol and the like.

The acid employed may be virtually any acid which forms a quaternary sulfonium salt. Preferably the acid is an organic carboxylic acid. Examples of acids which may be employed are boric acid, formic acid, lactic acid, acetic acid, propionic acid, butyric acid, hydrochloric acid, phosphoric acid and sulfuric acid. Preferably, the acid is an acid having a dissociation constant greater than about $1 \times 10^{-5}$.

The ratio of sulfide to acid is not unduly critical. Since one mole of acid is utilized to form one mole of sulfonium group, it is preferred that at least about one mole of acid be present for each mole of desired sulfide-to-sulfonium conversion.

The sulfide/acid mixture and the epoxy compound are reacted by mixing the components, usually at moderately elevated temperatures such as 70°–110°C. A solvent is not necessary, although one is often used in order to afford better control of the reaction. Aromatic hydrocarbons, monoalkyl ethers of ethylene glycol, aliphatic alcohols are suitable solvents. The proportions of the sulfide to the epoxy compound can be varied and the optimum proportions depend upon the particular reactants. Ordinarily, however, from about one part to about 50 parts by weight of the sulfide per 100 parts of epoxy compound is employed. The proportions are usually chosen with reference to the amount of sulfur, which is typically from about 0.1 to about 35 percent, based on the total weight of the sulfide and the epoxy compound.

Since the sulfide and phosphine react with the epoxy group, where epoxy group-containing products are desired, less than an equivalent of sulfide or phosphine should be employed so that the resultant resin has one epoxy group per average molecule.

The particular reactants, proportions and reaction conditions should be chosen in accordance with considerations well-known in the art, so as to avoid gelation of the product during the reaction. For example, excessively severe reaction conditions should not be employed. Similarly, compounds having reactive substituents should not be utilized along with epoxy compounds with which those substituents might react adversely at the desired conditions.

It is usually necessary, in order to insure rapid and complete curing of the polymers of the invention, to have present in the coating mixture an externally added catalyst for urethane formation. However, if curing temperatures after deposition are high enough, catalyst may not be needed. Also, if the proper blocking agent for the isocyanate is employed, e.g., oximes, catalyst may not be needed. Examples of externally added catalyst are the tin compounds such as dibutyl tin dilaurate and tin diacetate are preferred but other catalysts for urethane formation known in the art may be employed. The amount of catalyst employed is that amount which effectively promotes reaction of the deposited film, for example, amounts varying from about 0.5 percent to about 4 percent by weight of the polymer may be employed. Typically about 2 percent by weight is employed.

The polymer of the invention and catalyst mixture is electrodeposited on a suitable substrate and cured at elevated temperatures, such as from about 250°F. to about 600°F., the film curing at least in part through urethane crosslinks. The alcohol released may either volatilize or remain in the mixture as a plasticizer, depending essentially on its boiling point.

The products forming the resin of the invention may be crosslinked to some extent; however, it remains soluble in certain organic solvents and can be further cured to a hard, thermoset state. It is significantly characterized by its epoxy or hydroxyl content and chemically bound quaternary onium content, and capped isocyanate group content.

Aqueous compositions containing the above reaction products are highly useful as coating compositions and can be applied by any conventional method, such as by dipping, brushing, etc. They are, however, eminently suited to application by electrodeposition.

Where the resin of the invention was prepared employing at least in part a salt of an acid having a dissociation constant greater than $1 \times 10^{-5}$, it is not necessary to add a solubilizing agent to the product to obtain a suitable aqueous electrodepositable composition, although an acid or acidic solubilizing agent can be added if desired. Where boric acid salts or similar boron compounds, as described above, are employed to prepare the resin without the presence of a salt of an acid having a dissociation constant greater than $1 \times 10^{-5}$, compositions within the scope of this invention can be prepared by adding such an acid, the stronger acid replacing the boron compound in the resin and the boron compound forming substantially undissociated boric acid remaining in the aqueous media and being at least partially codeposited with the resin.

The presence of a boron compound in the electrodeposited film is of substantial benefit in that boron compounds apparently catalyze the cure of the deposited film, allowing lower cure temperatures and/or harder films.

The acid or acidic solubilizing agent may be any acid having a dissociation constant greater than $1 \times 10^{-5}$. Preferably, the acid or acidic solubilizing agent should be an organic acid having a dissociation constant greater than about $1 \times 10^{-5}$, the presently preferred acid being lactic acid. The addition of acid aids in stabilizing the resin, since the epoxy may tend to further polymerize on storage under highly alkaline conditions. In some cases, the acid also helps to obtain more complete dissolution of the resin. It is also desirable to electrodeposit these coatings from an acidic or only slightly basic solution (e.g., having a pH between about 3 and about 8.5), and the addition of acid thus is often useful to achieve the desired pH.

Where a carboxyl amine is employed in forming the resin of the invention, the resultant resin contains a Zwitterion, or internal salt, that is, an interaction between the quaternary group formed and the carboxyl group present, the carboxyl group displaying a dissociation constant greater than $1 \times 10^{-5}$. The resultant resin is inherently self-solubilized without the use of external solubilizing agents.

The resin of the invention, when placed in a water-containing medium, such as an electrodeposition high solids feed concentrate or the electrodeposition bath, changes character. Since frequently the boron, if present, is apparently weakly chemically-bound in the resin, it is subject to cleavage from the resin molecule and, while the boron electrodeposits with the resin and is found in the electrodeposited film, the boron may be removed from the water-containing medium, in whole or in part, by separation means, such as electrodialysis or ultrafiltration, in the form of boric acid.

Thus, the resin in aqueous medium can be characterized as a water-containing medium in which the resin molecule contains capped isocyanate groups, hydroxyl and/or epoxy groups, and chemically-bound quaternary onium base salts sufficient to solubilize the resin.

Electrodepositable compositions, while referred to as "solubilized", in fact are considered a complex solution, dispersion or suspension, or a combination of one or more of these classes in water, which acts as an electrolyte under the influence of an electric current. While, no doubt, in some instances and perhaps in most, the resin is a dispersion which may be called a molecular dispersion of molecular size between a colloidal suspension and a true solution.

The concentration of the product in water depends upon the process parameters to be used and is, in general, not critical, but ordinarily the major proportion of the aqueous composition is water, e.g., the composition may contain one to 25 percent by weight of resin. In most instances, a pigment composition and, if desired, various additives such as surface-active agents, coupling solvents, and the like known in the electrodeposition art are included. The pigment composition may be of any conventional type, comprising, for example, one or more pigments such as iron oxides, lead oxides, strontium chromate, carbon black, titanium dioxide, talc, barium sulfate, cadmium yellow, cadmium red, chromic yellow, coal dust, and the like.

In electrodeposition processes employing the aqueous coating compositions described above, the aqueous composition is placed in contact with an electrically-conductive anode and an electrically-conductive cathode, with the surface to be coated being the cathode. Upon passage of electric current between the anode and the cathode, while in contact with the bath containing the coating composition, an adherent film of the coating composition is deposited on the cathode. This is in contrast to processes utilizing polycarboxylic acid resins which deposit on the anode, and many of the advantages described above are in large part attributed to this cathodic deposition.

The conditions under which the electrodeposition is carried out are in general similar to those used in electrodeposition of other types of coatings. The applied voltage may be varied greatly and can be, for example, as low as one volt or as high as several thousand volts, although typically between 50 volts and 500 volts. The current density is usually between about 1.0 ampere and 15 amperes per square foot and tends to decrease during electrodeposition.

The method of the invention is applicable to the coating of any electrically-conductive substrate, and especially metals such as steel, aluminum, copper, and the like.

After deposition, the coating is cured at elevated temperatures by any convenient method, such as in baking ovens or with banks of infrared heat lamps. Curing temperatures depend principally on the capping agent for the isocyanate and are usually preferably from about 350°F. to about 425°F., although curing temperatures from about 250°F. to about 500°F. or even 600°F. may be employed, if desired.

Illustrating the invention are the following examples, which, however, are not to be construed as limiting the invention to their details. All parts and percentages in the examples, as well as throughout this specification, are by weight unless otherwise specified.

EXAMPLE I

Into a reactor equipped with azeotrope means were charged 400 parts of a polyglycidyl ether derived from the condensation of Bisphenol A and epichlorhydrin possessing an epoxy equivalent of 485 (EPON 1001) and 118 parts of methyl-n-butyl ketone (urethane grade). The mixture was heated to reflux for one hour and 2 milliliters of water were extracted. The mixture was then cooled to 100°C. There was then added 200 parts of toluene diisocyanate (TDI), half-capped with 2-ethyl hexanol. The temperature of the mixture dropped to 82°C. and there was added 0.5 gram of dibutyl tin dilaurate. Heat was applied and the reaction mixture exothermed to 104°C. The reaction mixture was held for 1 hour at 120°–125°C. The reaction mixture was scanned by IR and was shown to be devoid of free NCO groups.

To the reaction mixture at 98°C. there was then added a mixture of 59.4 parts of 85 percent lactic acid, 68.5 parts of thiodiethanol and 40 parts of deionized water. The temperature dropped to 75°C. Heat was applied. The mixture was white, opaque, and resinous. The reaction mixture was held at 90°-98°C. for 45 minutes. The resin mixture cleared but was still somewhat cloudy. At 80°C. there was then added 35 parts of ethylene glycol monobutyl ether (butyl CELLOSOLVE) and 25 parts of water. There was then added an additional 54 parts of butyl CELLOSOLVE. The analysis of the resultant resin composition showed 68.3 percent solids, a hydroxyl value of 174, an epoxide value of 7,000. This product is hereinafter identified as Resin A.

A pigment paste was prepared with a resin containing quaternary ammonium salt groups. The resin was the reaction product of two equivalents of EPON 836 with 0.9 equivalents of polypropylene glycol 600. The resin was quaternarized with dimethyl ethanolamine (DMEA) lactate to the extent of 0.75 equivalent of DMEA lactate nitrogen to one equivalent of epoxide group. The resin was 65 percent solids in a solvent comprising 78 percent water, 12.6 percent 2-ethylhexanol, 6 percent isopropanol, 3.2 percent xylene (This resin was prepared in accordance with the teachings of U.S. Pat. Application Ser. No. 167,470, filed July 29, 1971.). This resin is hereinafter identified as Resin B.

The pigment paste was prepared by admixing 1,430 parts of Resin B, 4,360 parts of titanium dioxide, 500 parts of aluminum silicate, 10.5 parts of red iron oxide, 108.5 parts of yellow iron oxide, 18 parts of carbon black and 1,270 parts of deionized water. The paste was ground in a pebble mill to an NSF No. 7 grind.

Electrodepositable composition was prepared by admixing 178 parts of Resin A, 70.5 parts of the above pigment paste and 3.6 parts of dibutyl tin dilaurate. The mixture was reduced to approximately 10 percent solids by the addition of 1,650 parts of deionized water.

The conductivity of the electrodeposition bath was 760 mmhos, and the electrodeposition bath demonstrated a Ford throw power at 300 volts for 90 seconds at 80°F. of 4 3/4 inches.

The electrodepositable composition was electrodeposited on galvanized steel panels serving as the cathode at a bath temperature of 77°F. for 90 seconds and the resultant panels baked at 385°F. for 20 minutes. The panels were coated at 250 volts, 350 volts and 400 volts. Respective film builds 0.35 mil, 0.5 mil and 0.75 mil. All films demonstrated 6H pencil hardness, were resistant to rubbing with acetone, withstood 160 inch pounds direct impact and showed only a slight failure at 160 inch pounds reverse impact.

The same composition at higher solids with higher levels of dibutyl tin dilaurate (5 percent on solids) produced an excellent flow coating.

EXAMPLE II

Into a reactor were charged 400 parts of EPON 1001 and 118 parts of methyl monobutyl ketone (urethane grade) and the reaction mixture heated to reflux and azeotroped. After one hour, two milliliters of water had been removed. The temperature of the mixture was dropped to 95°C. and 188 parts of 2-ethylhexyl alcohol half-capped TDI added. There was then added 0.5 part of dibutyl tin dilaurate. The temperature of the mixture dropped to 70°C. The mixture was heated to 88°C., at which time the reaction mixture exothermed to 120°C. The reaction mixture was held at 120°-122°C. for 65 minutes, at which point an IR scan showed no free NCO.

The reaction mixture was cooled to 97°C. and there was added a solution of 49.0 parts of thiodiethanol, 42.3 parts of 85 percent lactic acid, together with 28.5 parts of deionized water. The reaction mixture was milky and the temperature dropped to 78°C. The reaction mixture was heated between 90°-98°C. for 45 minutes. The reaction mixture cleared. There was then added a solution of 50 parts butyl CELLOSOLVE and 78 parts of deionized water. A yellow hazy resin was obtained which when analyzed contained 67.1 percent solids, a hydroxyl value of 93.2 and an epoxide value of 2,793.

An electrodepositable composition was prepared as follows: There was admixed 199.5 parts of the above resin, 78.5 parts of the pigment paste of Example I, 3.6 parts of dibutyl tin dilaurate and 1,630 parts of deionized water to provide an electrodeposition bath of approximately 10 percent solids.

EXAMPLE III

A first acrylic polymer was prepared as follows: The monomer feed composition was as follows:

| Monomer | Parts by Weight |
|---|---|
| Reaction product of 2-ethylhexanol half-capped TDI and hydroxyl-ethylacrylate | 66 |
| Butyl acrylate | 90 |
| Styrene | 60 |
| 2-hydroxyethyl acrylate | 21 |
| Glycidyl methacrylate | 48 |
| Methyl methacrylate | 15 |

The above monomer mixture also contained 4.5 parts of VAZO [azobis(isobutyronitrile)] and 9 parts of tertiary dodecyl mercaptan.

The polymer was prepared in a reaction flask equipped with thermometer, stirrer, reflux condenser and monomer addition means in a continuous nitrogen gas blanket. Into the reactor was charged 75 parts of butyl CELLOSOLVE and the contents of the reactor heated to 95°C. One-quarter of the monomer feed was added over a 4-minute period. The reaction mixture exothermed to 112°C. and was held for 85 minutes. The reaction mixture then dropped to 95°C. and the additional monomer added over a 2-hour period, with heating. The final temperature was 135°C. The reaction mixture was held between 135°C. and 168°C. for 4 1/4 hours. The reaction mixture was cooled and there was then added 0.3 parts of 2,6-ditertiary butyl para-cresol.

To the reaction mixture at 95°C. was added a mixture of 38.7 parts of thiodiethanol, 33.4 parts of 85 percent lactic acid and 30 parts of deionized water. The reaction mixture was then held at 95°-97°C. for one hour and 40 minutes. There was then added 10 parts of water. The resin analyzed to contain 69.9 percent solids, hydroxyl value 192, epoxy value of infinity. This resin is hereinafter referred to as Resin C.

In a similar manner, an interpolymer was prepared by interpolymerizing the following monomer mixture in accordance with procedure set forth above.

| Monomer | Parts by Weight |
|---|---|
| Methyl methacrylate | 105 |
| Ethyl methacrylate | 57 |
| Styrene | 45 |
| Glycidyl methacrylate | 33 |
| Reaction product of 2-ethylhexanol half-capped TDI and hydroxylethylacrylate | 60 |

The monomer mixture also contained 9 parts of tertiary dodecyl mercaptan and 4.5 parts of VAZO, the polymerization was conducted in 75 parts of butyl CELLOSOLVE and equivalent amount of inhibitor added at the end of the polymerization.

To this resin at 100°C. were added a mixture of 28.4 parts of thiodiethanol, 26.4 parts of 85 percent lactic acid and 20 parts of deionized water. The reaction mixture was held at 95°–98°C. for 4½ hours and then there were added 20 parts of water. This resin analyzed to contain 78.8 percent solids, a hydroxyl value of 87, and an epoxy value of infinity. This resin is hereinafter referred to as Resin D.

A pigment paste was prepared by admixing 103 parts of Resin D, 300 parts of titanium dioxide, 3 parts of a non-ionic surfactant, and 107 parts of butyl CELLOSOLVE. The pigment paste was ground to an NSF No. 7 grind.

An electrodepositable composition was prepared by admixing 76.5 parts of the above pigment paste, 123 parts of Resin A, 2 parts of dibutyl tin dilaurate and 1250 parts of deionized water to produce an approximately 10 percent solids electrodeposition bath having a conductivity of 515 mmhos and a pH of 3.6. Zinc phosphate treated steel panels were electrocoated at 300 volts for 120 seconds at a bath temperature of 77°F. and baked at 350°F. for 20 minutes. The resultant film build was 1.1 to 1.5 mils. The films were glossy white, had a 2H pencil hardness and had excellent resistance to acetone.

Similar panels were electrocoated at 300 volts for 90 seconds at a bath temperature of 77°F. and baked at 350°F. for 20 minutes. The film build was 1.0 mil with smooth white gloss and had a pencil hardness of 2H and was resistant to acetone rubbing. The film withstood both forward and reverse impact of 40 inch pounds.

EXAMPLE IV

Into a suitable reactor were charged 267 parts of methyl-n-butyl ketone solvent and 485 parts of a polyglycidyl ether derived from the condensation of Bisphenol A and epichlorohydrin, possessing an epoxy equivalent weight of 485 (EPON 1001). The mixture was dissolved with agitation and heated to reflux at approximately 130°C. and held for 25 minutes, when any water present was azeotroped off and separated in a trap.

The mixture was then cooled to 100°C. and there was added 384 parts of the 2-ethylhexyl monourethane of 2,4-toluene diisocyanate at 95 percent solids in methyl-n-butyl ketone. There was then added 0.8 part of dibutyl tin dilaurate catalyst. After the initial exotherm subsided, the reaction mixture was heated to 120°C. and held for about 30 minutes to insure complete isocyanate reaction, as indicated by the infrared scan of the reaction mixture.

The reaction mixture was then cooled to 75°C., at which point a mixture of 220 parts of dimethyl dodecyl amine, 104.5 parts of 88 percent lactic acid and 44.3 parts of isopropanol and 45.6 parts of water were introduced slowly over a one hour period, while maintaining the reaction temperature at about 80°C. After the addition was complete, the reaction mixture was held for an additional 20 minutes at 80°C. and 100 parts of water was then added. The reaction mixture was then cooled.

To 53.9 parts of the above quaternized, self-curing urethane resin solution was blended 0.8 part of dibutyl tin dilaurate catalyst. The mixture was reduced with 345.3 parts of water to yield an electrodeposition bath of approximately 10 percent solids with a pH of 6.4.

Using conventional electrodeposition procedures, a zinc phosphate pretreated steel panel was electrocoated as a cathode at 250 volts for a two-minute period, the bath being at room temperature. The panel, after rinsing, was cured in an oven for 20 minutes at 350°F. The baked film was a glossy, acetone-resistant coating of 0.4 mil film thickness and possessed an H pencil hardness.

EXAMPLE V

Into a suitable reactor were charged 197 parts by weight of methyl isobutyl ketone and 381 parts by weight of a polyglycidyl ether derived from the condensation of Bisphenol A and epichlorohydrin possessing an epoxy equivalent weight of 485 (EPON 1001). The epoxy was dissolved with agitation and heated to reflux at approximately 125°C. and held for 20 minutes, when any water present was azeotroped off and separated in the trap.

The mixture was cooled to 95°C. and there was added 250 parts by weight of methylethyl ketoxime capped monourethane of isophorone diisocyanate at 90 percent solids in methyl isobutyl ketone. The reaction mixture was held for about 90 minutes to insure complete isocyanate reaction as indicated by the infrared scan of the reaction mixture.

The reaction mixture was then cooled to 75°C. at which point a mixture of 160 parts by weight of dimethyldodecyl amine, 78 parts by weight of an 88 percent by weight aqueous solution of lactic acid, 43 parts by weight of isopropanol and 34 parts by weight of water were introduced slowly over a 1 hour period while maintaining the reaction mixture at about 80°C. After addition was complete, the reaction mixture was held for an additional 20 minutes at 80°C. and 100 parts by weight of water was then added. The reaction mixture was then cooled.

53.9 parts by weight of the above quaternary ammonium self-curing urethane resin was reduced with 343 parts by weight of deionized water to yield an electrodeposition bath of approximately 10 percent solids with a pH of 8.3.

Using conventional electrodeposition procedures, a zinc phosphate pretreated steel panel was electrocoated as a cathode at 50 volts for a two minute period, the bath being at room temperature. The panel, after rinsing, was cured in an oven for 10 minutes at 350°F. The baked film was an acid-resistant bubbled coating.

EXAMPLE VI

Into a suitable reactor were charged 1871 parts by weight of a polyglycidyl ether derived from the condensation of Bisphenol A and epichlorohydrin, possessing an epoxy equivalent weight of about 195 (EPON 829), and 604 parts by weight of Bisphenol A and 477 parts by weight of a polycaprolactone diol sold commercially by Union Carbide Corporation under the trade name PCP 0200.

The charge was agitated and heated to exotherm at about 160°C. The mixture was permitted to exotherm freely and held for approximately 40 minutes between 160°–192°C. The mixture was then cooled to 145°C. and then 5.5 parts by weight of dimethylethanolamine was added to the reaction mixture. The mixture was held at about 135°C. for approximately 3½ hours after which time 9.1 parts by weight of an 85 percent by weight aqueous lactic acid solution was added, followed by the addition of 214 parts by weight of 2-ethyl hexanol. The reaction mixture cooled upon addition of the 2-ethyl hexanol to 117°C. and then an additional 77.5 parts by weight of 2-ethyl hexanol were added to cool the reaction mixture to about 104°C., after which time a mixture of 616 parts by weight of dimethylcyclohexylamine lactate and 200 parts by weight of deionized water were charged to the reactor. The temperature of the mixture in the reactor was held at 91°–99°C. for about 55 minutes, after which time it was thinned with 396 parts of methylethyl ketone to produce 75 percent total solids solution.

Forty parts by weight of the above-described quaternary ammonium resin was then blended with 6 parts by weight of benzyl butyl phthalate (plasticizer) and 12.9 parts by weight of a ketoxime fully blocked polyisocyanate crosslinking agent prepared as described below. The blend was reduced with 341 parts by weight of deionized water to yield an electrodeposition bath of approximately 7 percent total solids with a pH of 5.6.

The crosslinking agent was prepared by charging with agitation into a suitable reactor 3,550 parts of a trifunctional aliphatic isocyanate sold by Mobay Chemical Company under the trademark DESMOTURN-100 and 1182 parts by weight of methyl normal butyl ketone. To this agitated mixture was slowly added over a period of about 1½ hours 1815 parts by weight of methylethyl ketoxime keeping the reaction mixture temperature below 23°C. The cooling was removed and the reaction mixture held until infrared analysis showed no free NCO groups.

Using conventional electrodeposition procedures, a zinc phosphate pretreated steel panel was electrocoated as a cathode in the electrodeposition bath described above at 80 volts for two minutes, the bath being at room temperature. The panel, after rinsing, was cured in an oven for 10 minutes at 325°F. The baked film was a smooth acetone-resistant coating of 0.6 mil film thickness which possessed a 3H pencil hardness.

In the manner of the above examples, various other epoxy resins, semi-capped isocyanates and quaternary group-forming reactants can be employed to provide resins within the scope of this invention.

According to the provisions of the Patent Statutes, there are described above the invention and what are now considered to be its best embodiments. However, within the scope of the appended claims, it is to be understood that the invention can be practiced otherwise than as specifically described.

We claim:

1. A method of electrocoating an electrically-conductive surface serving as a cathode comprising passing an electric current between said cathode and an anode in electrical contact with an aqueous electrodepositable composition, wherein said electrodepositable composition comprises an aqueous dispersion of:
   A. a quaternary onium salt group-containing resin comprising the reaction product of:
      1. an epoxy group-containing reaction product of an epoxy group-containing organic material and a semi-capped organic polyisocyanate; and
      2. a reactant selected from the group consisting of an amine acid salt, a sulfide-acid mixture, and a phosphine-acid mixture, said reactant reacted with said epoxy group-containing reaction product in an amount and at a temperature sufficient to provide a quaternary onium salt-containing, water-dispersible resin;
   said quaternary onium group salt-containing resin (A) containing hydroxyl groups and capped isocyanate groups, said capped isocyanate groups stable at room temperature but reactive with hydroxyl groups at elevated temperatures; and
   B. a catalytic amount of a catalyst for urethane formation.

2. A method as in claim 1 wherein the isocyanate groups are capped with an alcohol or ketoxime.

3. A method as in claim 1 wherein the isocyanate groups are capped with a phenol.

4. A method as in claim 1 wherein the isocyanate groups and hydroxyl groups are present in a ratio of about 0.5 to about 2.0 latent urethane groups per hydroxyl group.

5. A method as in claim 1 wherein the resin (A) contains free epoxy groups.

6. A method as in claim 1 wherein the quaternary onium group is a sulfonium group.

7. A method as in claim 6 wherein the isocyanate groups are capped with an alcohol or ketoxime.

8. A method as in claim 6 wherein the isocyanate groups are capped with a phenol.

9. A method as in claim 6 wherein the isocyanate groups and hydroxyl groups are present in a ratio of about 0.5 to about 2.0 latent urethane groups per hydroxyl group.

10. A method as in claim 6 wherein the resin (A) contains free epoxy groups.

11. A method as in claim 6 wherein the resin (A) is devoid of free epoxy groups.

12. A method of electrocoating an electrically-conductive surface serving as a cathode comprising passing an electric current between said cathode and an anode in electrical contact with an aqueous electrodepositable composition, wherein said electrodepositable composition comprises an aqueous dispersion of:
    a quaternary onium salt group-containing resin comprising the reaction product of:
       1. an epoxy group-containing reaction product of an epoxy group-containing organic material and a semi-capped organic polyisocyanate; and
       2. a reactant selected from the group consisting of an amine acid salt, a sulfide-acid mixture, and a phosphine-acid mixture, said reactant reacted with said epoxy group-containing reaction product in an amount and at a temperature sufficient to provide a quaternary onium salt-containing, water-dispersible resin;
    said quaternary onium group salt-containing resin containing hydroxyl groups and capped isocyanate groups, said capped isocyanate groups stable at room temperature but reactive with hydroxyl groups at elevated temperatures.

13. A method as in claim 12 wherein the isocyanate groups are capped with an alcohol or ketoxime.

14. A method as in claim 12 wherein the isocyanate groups and hydroxyl groups are present in a ratio of about 0.5 to about 2.0 latent urethane groups per hydroxyl group.

15. A method as in claim 12 wherein the resin contains free epoxy groups.

16. A method as in claim 12 wherein the quaternary onium group is a sulfonium group.

* * * * *